(12) United States Patent
Pudar et al.

(10) Patent No.: US 8,744,745 B2
(45) Date of Patent: Jun. 3, 2014

(54) METHOD OF USING VEHICLE LOCATION INFORMATION WITH A WIRELESS MOBILE DEVICE

(75) Inventors: Nikola J. Pudar, Farmington Hills, MI (US); Steven P. Schwinke, Plymouth, MI (US); Steven C. Tengler, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 596 days.

(21) Appl. No.: 12/796,114

(22) Filed: Jun. 8, 2010

(65) Prior Publication Data

US 2011/0301839 A1 Dec. 8, 2011

(51) Int. Cl.
G01C 21/00 (2006.01)
G01C 21/34 (2006.01)

(52) U.S. Cl.
USPC .......................................... 701/400

(58) Field of Classification Search
USPC .......................................... 701/202
See application file for complete search history.

(56) References Cited

U.S. PATENT DOCUMENTS

2002/0115436 A1* 8/2002 Howell et al. ................. 455/426

FOREIGN PATENT DOCUMENTS

CN 1916569 2/2007

OTHER PUBLICATIONS http://news.thewherebusiness.com/content/outwitting-car-thieves-your-mobile-phone.*
Patent Application for U.S. Appl. No. 12/787,472, filed May 26, 2010.
http://gizmodo.com/5483539/car-locator-android-app-makes-13000-1-month.
http://www.apptism.com/apps/where-s-my-car.

* cited by examiner

Primary Examiner — Maceeh Anwari
(74) Attorney, Agent, or Firm — Anthony Luke Simon; Reising Ethington P.C.

(57) ABSTRACT

A system and method for monitoring vehicle position includes receiving vehicle location information at a mobile wireless device via short-range communication from the vehicle, storing the received vehicle location information at the wireless mobile device, receiving a request from a user of the wireless mobile device for a navigational route to the vehicle, determining the location of the wireless mobile device, and providing at the wireless mobile device the navigational route between the wireless mobile device and the vehicle based on the wireless mobile device location and vehicle location. This can be helpful where a user has parked his or her car and thereafter needs assistance locating where it is parked.

18 Claims, 2 Drawing Sheets

METHOD OF USING VEHICLE LOCATION INFORMATION WITH A WIRELESS MOBILE DEVICE

TECHNICAL FIELD

The present invention relates generally to vehicles and wireless mobile devices and more particularly to the use of vehicle location information by the vehicle and the wireless mobile device.

BACKGROUND OF THE INVENTION

Increasingly, vehicle manufacturers outfit their vehicles with a wide array of wireless communications capabilities. Telematics units installed in modern vehicles can include hardware and software capable of determining the location of the vehicle. Telematics units can also wirelessly transmit and receive data communications, such as vehicle operational and configuration data, as well as vehicle location, via wireless communications. Recipients of these communications can include call centers that then process the received information and provide a variety of services in response. One example of a service provided by the call center could be vehicle tracking in the event of a vehicle theft. Telematics units also commonly have the ability to interface with the drivers or other occupant's cell phone via technologies such as Bluetooth to provide hands-free calling and music to the vehicle audio system.

SUMMARY OF THE INVENTION

According to an aspect of the invention, there is provided a method of monitoring vehicle position. The steps include receiving vehicle location information at a mobile wireless device via short-range communication from the vehicle; storing the received vehicle location information at the wireless mobile device; receiving a request from a user of the wireless mobile device for a navigational route to the vehicle; determining the location of the wireless mobile device; and providing at the wireless mobile device the navigational route between the wireless mobile device and the vehicle based on the wireless mobile device location and vehicle location.

According to another aspect of the invention, there is provided a method of monitoring vehicle position. The steps include generating vehicle location information at a vehicle using a vehicle telematics unit; establishing a short-range wireless communication channel between the vehicle telematics unit and a wireless mobile device; sending the generated vehicle location information to the wireless mobile device via the established communication channel; receiving information from the wireless mobile device via the established communication channel that identifies the wireless mobile device to the vehicle; storing the identity of the wireless mobile device at the vehicle; monitoring the vehicle for movement; and, if the vehicle moves: (1) contacting the wireless mobile device using the stored identity; (2) alerting the wireless mobile device of the vehicle movement; and (3) providing one or more options to the wireless mobile device for controlling the vehicle based on the alert.

According to yet another aspect of the invention, there is provided a method of monitoring vehicle position. The steps include linking a wireless mobile device carried by a vehicle owner with a vehicle; sending vehicle location information to the wireless mobile device when the speed of the vehicle is below a predetermined threshold; storing the sent vehicle location information at the wireless mobile device; receiving information at the vehicle from the wireless mobile device that identifies the wireless mobile device to the vehicle; storing the identity of the wireless mobile device at the vehicle; unlinking the wireless mobile device from the vehicle; determining if the vehicle remains stationary based on the sent vehicle location information; and if so, offering a navigational route between the wireless mobile device and the vehicle to the vehicle owner at the wireless mobile device based on the wireless mobile device location and the stored vehicle location information; otherwise, contacting the wireless mobile device using a vehicle telematics unit and the stored identity; and offering the vehicle owner one or more options with which to control the vehicle.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT

The method described below provides vehicle location information to a wireless mobile device and monitors a vehicle based on vehicle location information. Rather, or in addition to, monitoring vehicle location at a call center, the vehicle can work in conjunction with the wireless mobile device to determine if the vehicle remains in a location where the user left it. This can begin by linking the vehicle and wireless mobile device, via wireless or wired connection. To identify the wireless mobile device to the telematics unit, a vehicle owner or operator can link the device to the unit by exchanging identifying information between them. The telematics unit can then send vehicle location information representing the present location of the vehicle over a short-range wireless communications channel to the wireless mobile device where it can be stored for later use. The wireless mobile device can then be carried by the user when he or she leaves the vehicle.

Depending on whether the vehicle remains in the location where it was left while the wireless mobile device is away from the vehicle, the device can provide the owner of the vehicle (or wireless mobile device) one or more vehicle services. For example, the wireless mobile device can recall the last vehicle location information it received, determine the present location of the mobile device, and offer a navigational route between the wireless mobile device and the vehicle. That is, the wireless mobile device user can receive general or turn-by-turn directions back to the vehicle from nearly any location based on vehicle location information previously received from the vehicle. On the other hand, if the vehicle moves while the user and his or her wireless mobile device is away from the vehicle, the vehicle can notify the user of this movement via the mobile device, which can then offer additional vehicle services. These services can include providing the present location of the vehicle at the wireless mobile device, slowing or stopping the vehicle, or connecting to the call center or public safety answering point (PSAP).

Figure 1:
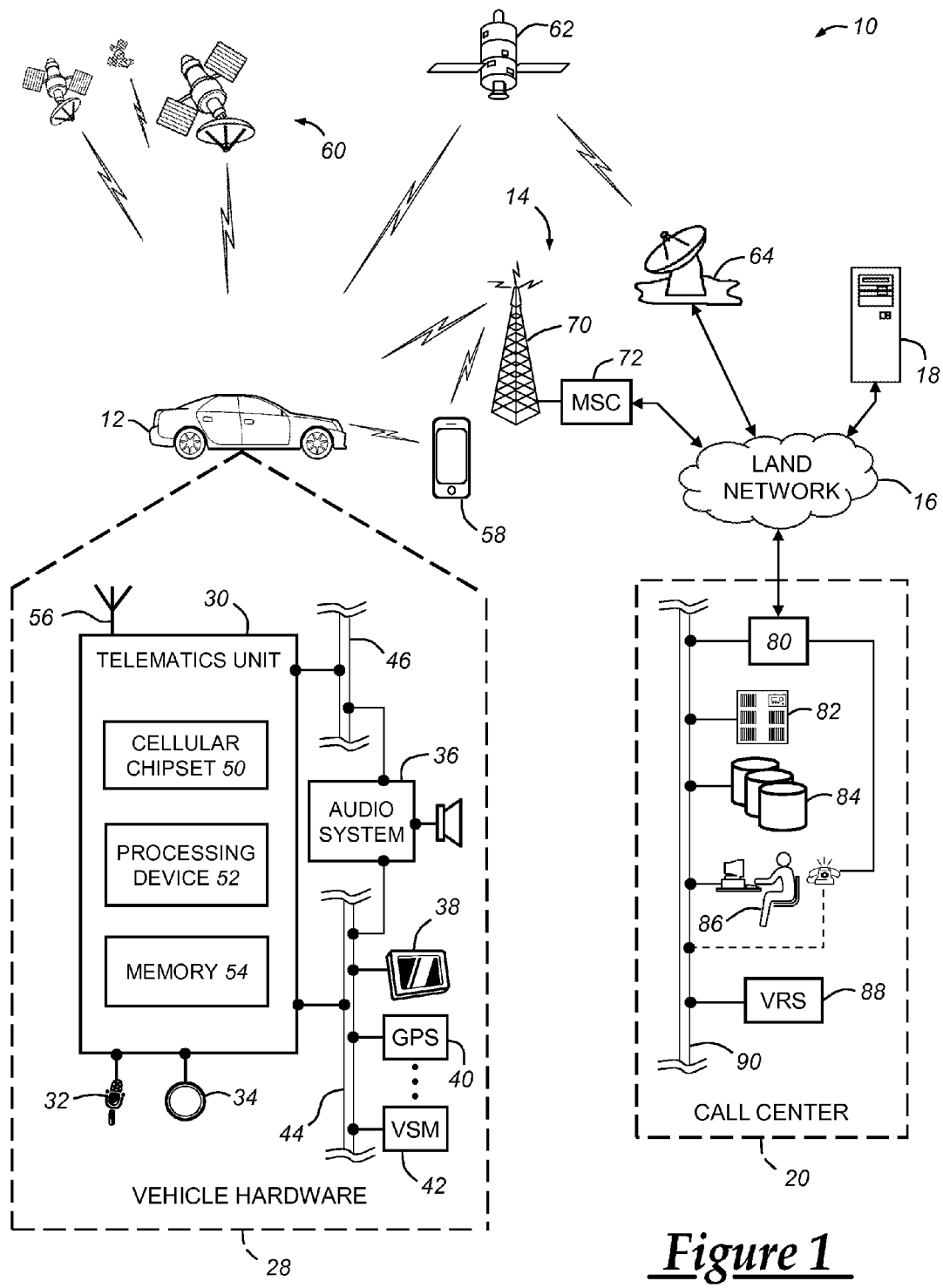
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 uses cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. When used for packet-switched data communication such as TCP/IP, the telematics unit 30 can be configured with a static IP address or can set up to automatically receive an assigned IP address from another device on the network such as a router or from a network address server. Wireless networking between the vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth.

One of those networked devices is a wireless mobile device 58 that can communicate with the vehicle 12 using the previously-mentioned wireless protocols. Examples of the wireless mobile device 58 can include cell phones, smart phones, PDAs, or other wireless mobile devices capable of communicating with the telematics unit 30 over a short-range wireless connection. Along with short-range communications capabilities, the wireless mobile device 58 also includes other functionality. For example, the device 58 can include a cellular chipset using cellular communications to send and receive voice and data transmissions, a GPS module that outputs the location of the device 58, and a microprocessor for carrying out various tasks such as analyzing location information and providing navigational directions between two geographical locations. In some embodiments, the mobile device 58 can include a downloadable software application (or "app") that can be used to provide the navigation route back to the vehicle and/or to provide an interface to the vehicle to, for example, provide the user with the additional vehicle services noted above (e.g., vehicle location reporting and vehicle stopping/slowdown control). Wireless mobile devices 58 can be carried or operated by any one of a number of individuals. These individuals can include vehicle owners, vehicle occupants, wireless mobile device owners, wireless mobile device users, or others. These users will be interchangeably described in the following descriptions.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. Vehicle slowdown and vehicle ignition disabling may also be controlled via the telematics unit to provide remote control over vehicle operation in case of, for example, vehicle theft. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) and can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
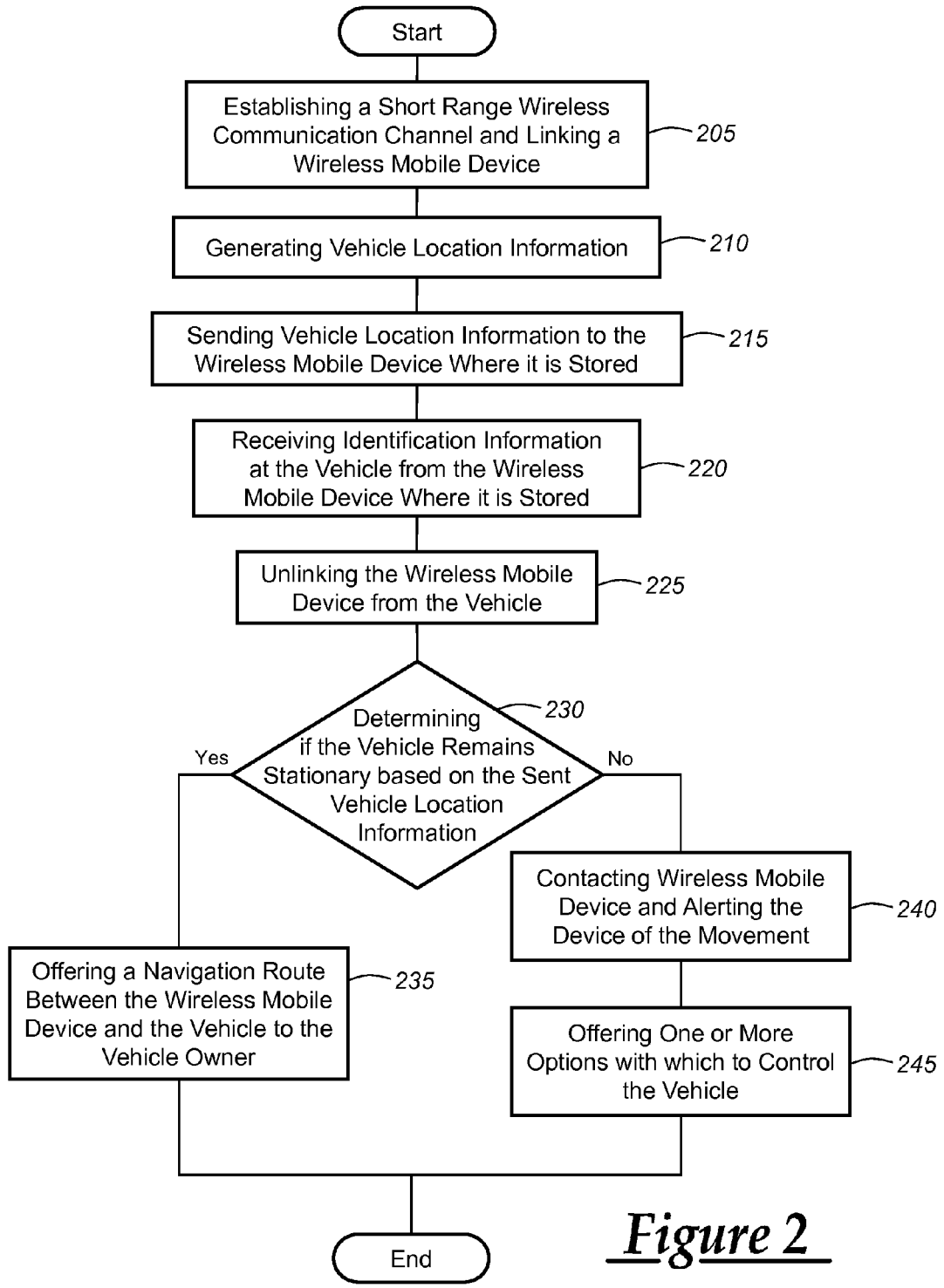
FIG. 2 is a flow chart of a method of monitoring vehicle position.

Turning now to FIG. 2, there is a method 200 of monitoring vehicle position. The method 200 begins at step 205 with establishing secure short-range wireless communication between the telematics unit 30 and one or more nearby wireless mobile devices, and can link the device with a vehicle. The telematics unit 30 and mobile device(s) can communicate with each other via any suitable short-range wireless communication technology, for example, one that uses a standardized protocol, such as Bluetooth or others, some of which have been listed above. In operation, the telematics unit 30 can broadcast a low-power signal that alerts wireless devices within proximity of the vehicle 12 that it is able to establish a wireless connection. If a device is nearby, such as the wireless mobile device 58, the telematics unit 30 can provide that device 58 with a wireless address of the telematics unit 30 and can receive in response a wireless address of the device 58. For example, this can take place when a vehicle owner enters the vehicle 12 while carrying the wireless mobile device 58. In this instance, the telematics unit 30 can be in a standby mode and begin searching for the wireless mobile device 58 after a door of the vehicle 12 is opened. The telematics unit 30 can also search for wireless mobile devices 58 when the vehicle owner turns the ignition of the vehicle 12 to the "on" position. Once both the telematics unit 30 and the wireless mobile device 58 each can identify each other, a secure wireless connection between them can be established over which the unit 30 and the device 58 can send and receive data. In some embodiments, this linking or pairing of the mobile device 58 with the telematics unit 30 can be implemented such that it initially requires operator authorization, after which the pairing can be carried out automatically without user involvement.

At step 210, vehicle location information is generated at the vehicle. The vehicle 12 includes hardware and software capable of determining the location of the vehicle 12. In one example, the telematics unit 30 carries a GPS module 40 that receives GPS signals from satellites and uses them to calculate the latitude and longitude coordinates of the vehicle position. Other techniques for determining vehicle location information are possible. In some cases, GPS satellite signals are weak or unavailable so the telematics unit 30 can receive vehicle data, such as vehicle speed, miles travelled, and vehicle direction, from one or more vehicle sensors and use that data to calculate vehicle location using geographic map data and a dead-reckoning algorithm.

At step 215, the vehicle location information is sent to the wireless mobile device over the established secure short-range wireless communication channel. Generally, the vehicle 12 outputs vehicle location information. And while it can be sent over the wireless carrier system 14 to the call center 20 or used to display the location of the vehicle 12 on the display 38, it can also be sent to the wireless mobile device 58 via the short-range wireless communication channel. The vehicle 12 can abide by certain criteria that determine when the vehicle location information can be sent to the wireless mobile device 58. For instance, it is possible to prevent the telematics unit 30 of the vehicle 12 from sending the vehicle location information unless the vehicle 12 is moving at a speed less than a predetermined threshold, such as three miles per hour. Or the telematics unit 30 is prevented from sending vehicle location data unless the vehicle 12 is stationary, but running (ignition on). After receiving the vehicle location information, it can then be stored at the wireless mobile device 58. Considering that the vehicle 12 regularly sends vehicle location information to the mobile device 58 while the vehicle ignition is on and the vehicle parked or moving very slowly, the wireless mobile device 58 can decide to save the information last received from the vehicle 12. Also, rather than regularly sending vehicle location to the mobile device, the vehicle telematics unit can be programmed to send it upon vehicle ignition being switched off, or placed into park, neutral or the parking brake engaged, or just once each time the vehicle stops.

In another example, the wireless mobile device 58 could decide to save not only the vehicle location information last received, but could also maintain a log of previously-received vehicle locations. This log can maintain vehicle location information that identifies one or more trips the vehicle 12 has taken. For instance, the wireless mobile device 58 can identify a beginning point of a trip and an ending point of a trip with an input at the device 58. The user or vehicle owner can alert the device 58 that a trip has begun or ended through this input, such as by pressing a button. Alternatively, the wireless mobile device 58 might assume that a trip has begun or ended based on some event, such as the activation or deactivation of the vehicle ignition. Between the beginning and ending of the trip, the wireless mobile device 58 periodically receives vehicle location information, such as GPS coordinate pairs, from the telematics unit 30 and can save them at the device 58.

At step 220, information that identifies the wireless mobile device to the vehicle is received and the identity of the wireless mobile device is stored. Apart from information establishing the short-range communication channel, the vehicle 12 can obtain additional information that identifies the wireless mobile device 58. In one example, this information can include a telephone number associated with the wireless mobile device 58 with which the telematics unit 30 can contact the device 58. That is, the wireless mobile device 58 can send the telephone number of the device 58 over the previously-established communication channel. Or, in another example, the telephone number of the wireless mobile device 58 can be sent via an SMS message to the vehicle 12 via the wireless carrier network.

It is also possible that information identifying the wireless mobile device 58 to the vehicle 12 can include a security feature. This security feature can be used to help prevent an unauthorized linking of the wireless mobile device 58 and vehicle 12. For example, the vehicle owner can program the telematics unit 30 to require a password or passcode before the wireless mobile device 58 and the vehicle 12 exchange information. After the communication channel has been established, the telematics unit 30 can query the wireless mobile device 58 to submit the previously-programmed password/passcode. The wireless mobile device 58 can transmit a response to the query via the communication channel. If the password/passcode is correct, the telematics unit 30 can recognize the wireless mobile device 58 as a trusted recipient. As a result, the telematics unit 30 can store contact information for the wireless mobile device 58 that is now considered a trusted recipient. That contact information can include such information as a telephone number, a wireless address, or other similar information. In another example, the information that identifies the wireless mobile device 58 can include an encryption scheme in which encryption key pairs are stored at both the vehicle 12 and the device 58. Both asymmetrical and symmetrical encryption techniques can be employed to securely transmit data between the vehicle 12 and the wireless mobile device 58, either over the short-range communication channel or the wireless carrier system 14, as is known to those skilled in the art.

At step 225, the wireless mobile device is unlinked from the vehicle. When the vehicle owner or vehicle occupant leaves the vehicle 12, the wireless mobile device 58 and/or the vehicle 12 ends the communication channel. Unlinking can occur when the owner occupant turns the ignition of the vehicle 12 off. Or unlinking the wireless mobile device 58 could occur when the device 58 is moved outside of the short-range wireless communication range of the vehicle 12 when the vehicle 12 is parked. When the unlinking occurs, the vehicle 12 will have saved information with which to contact the wireless mobile device 58 in the future and the device 58 will carry vehicle location information, such as a GPS latitude/longitude pair, that indicates where the vehicle owner/operator parked the vehicle 12.

At step 230, it is determined if the vehicle remains stationary based on the sent vehicle location information. This can be done in any one of a number of ways. For instance, when the vehicle 12 is parked and the wireless mobile device 58 is unlinked, the vehicle 12 can remember its last position. A trigger can then be set at the telematics unit 30 and if the vehicle location information representing the vehicle's last position changes, the unit 30 can detect that the vehicle 12 has not remained stationary. As an example the telematics unit 30 can save the vehicle position information as GPS coordinates when the vehicle 12 was parked. During the time that the vehicle 12 is parked, the telematics unit 30 can monitor the GPS module 40 for GPS coordinates that differ from those saved. If the driver returns without the trigger occurring (i.e., without the vehicle having been moved), then the trigger can be disabled or reset. Occurrence of the trigger can be determined using a threshold that can be set and if the saved GPS coordinates differ from the monitored GPS coordinates by an amount greater than a threshold amount, then the telematics unit 30 can decide that the vehicle 12 has not remained stationary. The value of the threshold can vary and include any suitable values, for example, anywhere from zero to 1000 ft from the last position of the vehicle 12. Conversely, if the saved GPS coordinates match the GPS coordinates received during the time the vehicle 12 is parked, then the telematics unit 30 can decide that the vehicle has remained stationary while it was parked. Other methods are possible. For example, the telematics unit 30 can monitor a VSM 42, which in turn can receive data from a wheel sensor. If the wheel sensor provides a signal that indicates wheel rotation, then the telematics unit 30 can decide that the vehicle 12 is moving. Or in another example, the telematics unit 30 can include an accelerometer that detects any one of a number of vehicle motions. The accelerometer can send a signal received by the processing device 52 when the vehicle 12 moves. Using that signal, the telematics unit 30 can determine that the vehicle 12 has moved from the place it was parked. If it is determined that the vehicle 12 has moved, the method 200 proceeds to step 235. Otherwise, the method 200 proceeds to step 240.

At step 235, a navigational route between the wireless mobile device and the vehicle can be provided to a vehicle owner at the wireless mobile device based on the wireless mobile device location and the previously-stored vehicle location information. Given that the vehicle 12 remained in the place it was parked when the wireless mobile device 58 was unlinked from the vehicle 12, the device 58 knows both the vehicle location and can calculate its own location. Using those two positions, the wireless mobile device 58 can then output navigation directions from the device 58 back to the vehicle 12. These directions can include a map display at the wireless mobile device 58 showing the location of the vehicle 12 and the present location of the device 58 with a path connecting the two. They can also include audibly-read turn-by-turn directions output by the wireless mobile device 58 as it moves. Or the device 58 can display an indicator, such as an arrow, that points in the direction of the vehicle 12 and/or a distance amount from the vehicle 12. In some embodiments, this navigation can be provided using a specialized application stored on the mobile device, such as one that is developed and provided specifically for the purpose of providing navigation back to the vehicle and, if desired, other vehicle services using the application and mobile device as a remote controller that connects to the vehicle via the short-range communication and/or the wireless carrier system 14.

In the event the vehicles does not remain stationary, then at step 240, the wireless mobile device is contacted using the stored identity (e.g., telephone number) and the telematics unit alerts the device of the vehicle movement. For example, if the telematics unit 30 determines that the vehicle 12 has been moved from the place it was last parked by more than the threshold amount, the unit can trigger a call to the telephone number of the wireless mobile device 58 and alert it of the vehicle movement. Alerting the wireless mobile device 58 can involve playing an audio recording informing the vehicle owner that the vehicle has moved when the telematics unit 30 calls the device 58. Alerting can also include providing vehicle location information to the wireless mobile device 58. This can involve streaming the latitude/longitude coordinates of the vehicle 12 gathered by the telematics unit 30 to the device 58 over the wireless carrier system 14 as the vehicle 12 moves. That way, the device 58 could display the position of the vehicle 12 on a geographical map depicting where the vehicle 12 is located or travelling. Again, this information from the vehicle can be received and presented to the user under control of a specialized application on the mobile device. In addition to or in lieu of sending this information to the device 58, it can be sent from the vehicle to the call center and the vehicle tracked in that way. This could also involve a call center advisor contacting the user via their mobile device 58. Alerting can also involve sending other vehicle data to the wireless mobile device 58. The data provided to the device 58 and/or call center 20 can include vehicle speed, direction, fuel levels, etc. Another example includes the telematics unit 30 sending an SMS message to the wireless mobile device 58 that includes information related to the movement of the vehicle 12 and/or vehicle data. In order to provide the device 58 a relevantly current position of the vehicle 12, it can be helpful to periodically send SMS messages to the device 58 updating the device 58 with new changes in vehicle location information, such as every five minutes.

At step 245, the vehicle owner is offered one or more options with which to control the vehicle. Given that the vehicle 12 is moving from the place it was parked, the wireless mobile device 58 can provide vehicle-controlling inputs to the vehicle owner (or device owner) to choose from. As with the providing of navigation and/or vehicle movement alerts, the vehicle control options provided to the user can be provided using an application running in the mobile device 58. For example, the wireless mobile device 58 can display one or more buttons, each of which could allow the vehicle owner to speak with a live advisor, speak with a PSAP, or prevent the vehicle 12 from starting again after its ignition is turned off. If the vehicle owner selects to speak with the live advisor, the wireless mobile device 58 can call the call center 20 and the live advisor there can monitor the vehicle 12. If necessary, the live advisor can send a machine-readable instruction to the telematics unit 30 to slow or stop the vehicle 12. If the vehicle owner chooses to contact the PSAP, the wireless mobile device 58 can access a list of PSAPs pre-saved at the device or could automatically dial 911. It is also possible that the live advisor can contact an appropriate PSAP from the call center 20 on behalf of the vehicle owner. In one embodiment, the call center contacts the PSAP where the vehicle is currently located. This can be done via a data query into a PSAP database identifying the proper PSAP where the vehicle is currently located. This database could resides at the call center 20 (e.g., as a part of database 84), or can be located externally. In another example, it is also be possible to offer an input selection at the device 58 selectable by the vehicle owner that would directly control vehicle operation, such as by preventing re-starting of the vehicle or gradually bringing the vehicle 12 to a stop or limit the vehicle 12 to low-speed operations, such as below 10 miles per hour. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of monitoring vehicle position, comprising the steps of:
    (a) linking a wireless mobile device carried by a vehicle owner with a vehicle;
    (b) receiving vehicle location information at the wireless mobile device via short-range communication from the vehicle when the speed of the vehicle is below a predetermined threshold;
    (c) storing the received vehicle location information at the wireless mobile device;
    (d) unlinking the wireless mobile device from the vehicle;
    (e) receiving a request from a user of the wireless mobile device for a navigational route to the vehicle;
    (f) determining the location of the wireless mobile device; and
    (g) providing at the wireless mobile device the navigational route between the wireless mobile device and the vehicle based on the wireless mobile device location and vehicle location.

2. The method of claim 1, wherein vehicle location information further comprises global positioning system (GPS) coordinates of the vehicle.

3. The method of claim 1, further comprising the step of obtaining the vehicle location information with a dead reckoning algorithm.

4. The method of claim 1, wherein the vehicle location information is saved at the wireless mobile device as a log of one or more vehicle trips.

5. The method of claim 4, wherein the beginning or ending of a vehicle trip is identified at the wireless mobile device.

6. A method of monitoring vehicle position, comprising the steps of:
    (a) generating vehicle location information at a vehicle using a vehicle telematics unit;
    (b) establishing a short-range wireless communication channel between the vehicle telematics unit and a wireless mobile device;

(c) sending the generated vehicle location information to the wireless mobile device via the established communication channel when the speed of the vehicle is below a predetermined threshold;

(d) receiving information from the wireless mobile device via the established communication channel that identifies the wireless mobile device to the vehicle;

(e) storing the identity of the wireless mobile device at the vehicle;

(f) monitoring the vehicle for movement based on the generated vehicle location information; and, if the vehicle moves:

(f1) contacting the wireless mobile device using the stored identity;

(f2) alerting the wireless mobile device of the vehicle movement; and (f3) providing one or more options to the wireless mobile device for controlling the vehicle based on the alert.

7. The method of claim 6, wherein the identifying information in step (d) further comprises a security feature.

8. The method of claim 6, wherein step (f) further comprises:

comparing vehicle location information received from the vehicle at the time the vehicle was parked with vehicle location information received after the vehicle was parked; and determining if the vehicle location information received after the vehicle was parked differs from the vehicle location information received from the vehicle at the time the vehicle was parked.

9. The method of claim 6, wherein step (f1) further comprises calling the telephone number of the wireless mobile device from the vehicle.

10. The method of claim 6, wherein step (f2) further comprises the step of sending vehicle location information over a wireless carrier system to the wireless mobile device from the vehicle.

11. The method of claim 6, wherein step (f2) further comprises playing an audio message at the wireless mobile device.

12. The method of claim 6, wherein the one or more options in step (f3) further comprise one or more of: slowing the vehicle, stopping the vehicle, or preventing the vehicle from starting once it has been shut off.

13. A method of monitoring vehicle position, comprising the steps of:

(a) linking a wireless mobile device carried by a vehicle owner with a vehicle;

(b) sending vehicle location information to the wireless mobile device when the speed of the vehicle is below a predetermined threshold;

(c) storing the sent vehicle location information at the wireless mobile device;

(d) receiving information at the vehicle from the wireless mobile device that identifies the wireless mobile device to the vehicle;

(e) storing the identity of the wireless mobile device at the vehicle;

(f) unlinking the wireless mobile device from the vehicle;

(g) determining if the vehicle remains stationary based on the sent vehicle location information; and if so, providing a navigational route between the wireless mobile device and the vehicle to the vehicle owner at the wireless mobile device based on the wireless mobile device location and the vehicle location information stored in step (c); and (h) if the vehicle was determined to not have remained stationary, then:

(h1) contacting the wireless mobile device using a vehicle telematics unit and the stored identity; and (h2) providing the vehicle owner one or more options with which to control the vehicle.

14. The method of claim 13, wherein step (g) further comprises:

comparing vehicle location information received from the vehicle at the time the vehicle was parked with vehicle location information received after the vehicle was parked; and determining if the vehicle location information received after the vehicle was parked differs from the vehicle location information received from the vehicle at the time the vehicle was parked.

15. The method of claim 13, wherein the stored identity comprises a telephone number assigned to the wireless mobile device wherein step (h1) further comprises calling the telephone number from the vehicle.

16. The method of claim 13, further comprising the step of sending vehicle location information over a wireless carrier system to the wireless mobile device from the vehicle.

17. The method of claim 13, wherein the one or more options in step (h2) further comprises one or more of: slowing the vehicle, stopping the vehicle, or preventing the vehicle from starting once it has been shut off.

18. The method of claim 13, wherein the identifying information in step (d) further comprises a security feature.

* * * * *